United States Patent
Rousselet et al.

(10) Patent No.: US 11,600,404 B2
(45) Date of Patent: Mar. 7, 2023

(54) ELECTRIC CABLE COMPRISING A METAL LAYER

(71) Applicants: NEXANS, Courbevoie (FR);
COMMISSARIAT A L'ENERGIE ATOMIQUE ET AUX ENERGIES ALTERNATIVES, Paris (FR)

(72) Inventors: Nicolas Rousselet, Saint-Genis-Laval (FR); Thierry Malvache, Antony (FR); Jean-Pierre Simonato, Sassenage (FR); Caroline Celle, Firminy (FR); Sonia Desousanobre, Saint Martin le Vinoux (FR); Sakina Yahiaoui, Vizille (FR); Florence Masse, Saint Martin d'Uriage (FR); Lucie Ordronneau, Villeurbanne (FR)

(73) Assignee: NEXANS, Courbevoie (FR)

( * ) Notice: Subject to any disclaimer, the term of this patent is extended or adjusted under 35 U.S.C. 154(b) by 668 days.

(21) Appl. No.: 16/311,102

(22) PCT Filed: Jun. 20, 2017

(86) PCT No.: PCT/FR2017/051624
§ 371 (c)(1),
(2) Date: Dec. 18, 2018

(87) PCT Pub. No.: WO2017/220920
PCT Pub. Date: Dec. 28, 2017

(65) Prior Publication Data
US 2020/0312486 A1    Oct. 1, 2020

(30) Foreign Application Priority Data
Jun. 20, 2016  (FR) .................................... 16 55727

(51) Int. Cl.
*H01B 7/22* (2006.01)
*H01B 13/22* (2006.01)
*B82Y 30/00* (2011.01)

(52) U.S. Cl.
CPC ............. *H01B 7/22* (2013.01); *H01B 13/228* (2013.01); *B82Y 30/00* (2013.01)

(58) Field of Classification Search
CPC ... H01B 1/20; H01B 1/22; H01B 1/24; H01B 3/004; H01B 7/02; H01B 7/08;
(Continued)

(56) References Cited

U.S. PATENT DOCUMENTS 7,459,627 B2 * 12/2008 Lee .................... H01B 11/1817
174/102 R
7,491,883 B2 * 2/2009 Lee .................... H01B 11/1808
174/28

(Continued)

FOREIGN PATENT DOCUMENTS

CN    1894753 A  *  1/2007  ............. H01B 13/00
CN    1894753 A      1/2007
(Continued)

OTHER PUBLICATIONS

Chinese Office Action dated Aug. 30, 2019.
(Continued)

*Primary Examiner* — William H. Mayo, III
(74) *Attorney, Agent, or Firm* — Sofer & Haroun, LLP

(57) ABSTRACT

An electric cable has at least one elongated electrical conductor (1), at least one electrically insulating layer (2) surrounding the elongated electrical conductor (1), and at least one metal layer (3) surrounding electrically insulating layer (2). The metal layer (3) has metal nanowires.

15 Claims, 1 Drawing Sheet

(58) Field of Classification Search
CPC ... H01B 7/18; H01B 7/22; H01B 7/30; H01B 11/18; H01B 11/1875; H01B 13/228; C09K 3/00; C09K 5/14; H05K 9/02; H05K 9/009; H01F 1/0054; H01R 9/05; H01R 13/50; H01R 43/24
USPC ........ 174/102 R–102 SC, 108, 110 R, 125.1, 174/125.2
See application file for complete search history.

(56) References Cited

U.S. PATENT DOCUMENTS

| | | | | |
|---|---|---|---|---|
| 7,750,240 | B2 * | 7/2010 | Jiang | H01B 13/0162 |
| | | | | 174/103 |
| 9,111,658 | B2 * | 8/2015 | Shah | H01B 1/24 |
| 9,193,586 | B2 * | 11/2015 | Wei | H01B 1/02 |
| 9,627,105 | B2 * | 4/2017 | Göbel | H01B 11/1808 |
| 2007/0296032 | A1 * | 12/2007 | Stumbo | B82Y 10/00 |
| | | | | 257/E29.151 |
| 2010/0139943 | A1 * | 6/2010 | Abe | H01B 3/445 |
| | | | | 977/773 |
| 2011/0209894 | A1 | 9/2011 | Williams et al. | |
| 2013/0025907 | A1 * | 1/2013 | Zheng | H01B 1/04 |
| | | | | 174/105 R |
| 2016/0009934 | A1 * | 1/2016 | Han | C09D 11/52 |
| | | | | 544/320 |

FOREIGN PATENT DOCUMENTS

| | | | | | |
|---|---|---|---|---|---|
| CN | 102337101 | A | * | 2/2012 | ............... C09K 3/00 |
| CN | 102337101 | A | | 2/2012 | |
| CN | 104515633 | | | 4/2015 | |
| CN | 104515633 | A | * | 4/2015 | ............... G01L 1/16 |
| CN | 105336434 | A | | 2/2016 | |

OTHER PUBLICATIONS

International Search Report dated Sep. 25, 2017.
CN Office Action dated Dec. 8, 2020.
Search Report dated Sep. 29, 2020.

* cited by examiner

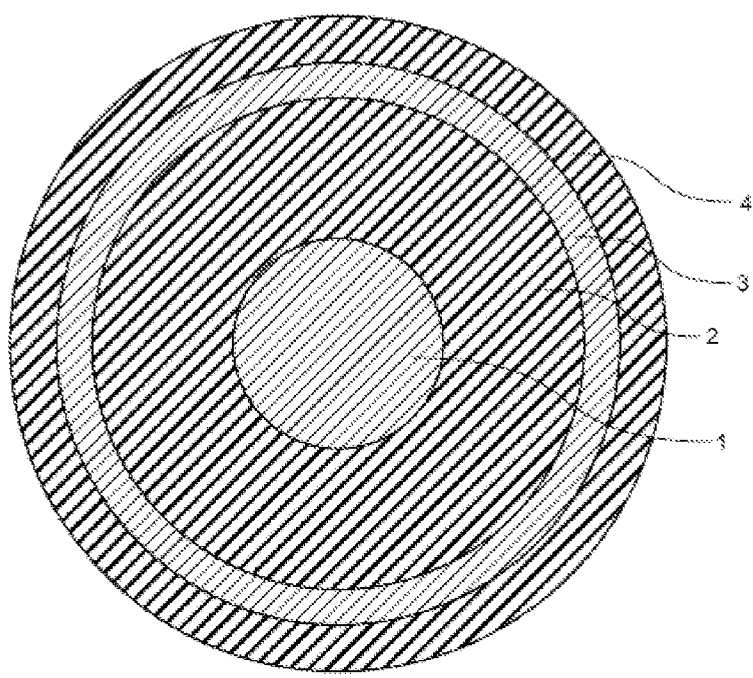

ELECTRIC CABLE COMPRISING A METAL LAYER

RELATED APPLICATION

This application is a National Phase of PCT/FR2017/051624, filed on Jun. 20, 2017, which claims the benefit of priority from French Patent Application No. 16 55727, filed on Jun. 20, 2016, the entirety of which are incorporated by reference.

BACKGROUND

Field of the Invention

The present invention relates to an electric cable comprising at least one metal layer and to a process for the manufacture of said cable.

It typically but not exclusively applies to the fields of coaxial electric cables.

Description of Related Art

A coaxial cable is conventionally an electric cable for the transmission of digital or analogue signals at high or low frequency, comprising two elongated electrical conductors separated by an electrically insulating layer. These two electrical conductors are positioned coaxially along the electric cable or, in other words, the axes of central symmetry of the two electrical conductors are coincident.

The document US 2010/0139943 describes a coaxial cable comprising a central electrical conductor surrounded by an internal insulating layer, the internal insulating layer being surrounded by a sintered metal layer comprising metal nanoparticles with a mean size of 100 nm or less. The metal layer is itself coated with an external insulating layer.

However, this type of coaxial cable exhibits electrical percolation properties which are not optimized. In addition, the process for the manufacture of this cable, in particular of the sintered metal layer, is relatively complex.

Objects and Summary

The aim of the present invention is to overcome the disadvantages of the techniques of the prior art by providing an electric cable, in particular of coaxial type, with a metal layer which is easy to employ, and which makes it possible to guarantee very good electrical and mechanical properties, whatever the cross section of the electric cable.

A subject-matter of the present invention is an electric cable comprising:
- at least one elongated electrical conductor,
- at least one electrically insulating layer surrounding said elongated electrical conductor,
- at least one metal layer surrounding said electrically insulating layer, characterized in that the metal layer comprises metal nanowires.

By virtue of the invention, the electric cable exhibits a metal layer with optimized electrical properties and a high flexibility, while being easy to employ and able to be used with any type of cable, even with a small diameter, such as, for example, an external diameter of at most 1.0 mm (millimetre) and preferably of at most 0.3 mm.

More particularly, the metal layer of the invention can advantageously be used as "shielding" layer, in particular for a coaxial cable. As such, the metal layer of the invention exhibits good electrical properties of the sheet resistance and/or attenuation type, such as a sheet resistance of less than 10 ohms/square and/or an attenuation of at least 20 dB which can range beyond 40 dB, the attenuation being determined according to Standard IEC 62153-4-10 (2015).

The Metal Layer

The metal layer of the invention is a layer comprising metal nanowires, surrounding the electrically insulating layer.

At least one of the metal nanowires, or more particularly the metal nanowires making up the metal layer, can have an aspect ratio strictly of greater than 1, preferably of at least 10, preferably of at least 50 and particularly preferably of at least 100.

Said metal nanowire(s) is(are) preferably of lamellar or cylindrical type.

The metal nanowires of the invention are thus preferably nanowires which do not have a spherical shape or, in other words, which do not have an aspect ratio equal to 1.

In the present invention, the aspect ratio is typically the ratio of the greatest dimension of said metal nanowire (such as, for example, the length of the nanowire of the lamellar or cylindrical type) to the smallest dimension of a metal nanowire (such as, for example, the thickness of a metal nanowire of the lamellar type or the diameter of a metal nanowire of the cylindrical type).

The metal nanowire(s) of the invention typically have at least one of their dimensions of nanometric size ($10^{-9}$ metre).

More particularly, the metal nanowire(s) of the invention can have at least one of their dimensions of at most 800 nm (nanometres), preferably of at most 600 nm and more preferably of at most 400 nm.

In addition, the metal nanowire(s) of the invention can have at least one of their dimensions of at least 4 nm and preferably of at least 50 nm.

Preferably, the metal nanowire(s) of the invention can have at least one of their dimensions ranging from 4 to 800 nm.

By way of example, on considering metal nanowires of the cylindrical type with a diameter and a length, the metal nanowire(s) of the invention can have:
- a diameter ranging from 4 to 800 nm and preferably ranging from 20 to 250 nm, and
- a length ranging from 0.5 to 800 µm and preferably ranging from 1 to 100 µm.

On considering several metal nanowires according to the invention, the term "dimension" is understood to mean the number-average dimension of the combined nanometric metal nanowires of a given population, this dimension being conventionally determined by methods well known to a person skilled in the art.

The dimension of the metal nanowire or nanowires according to the invention can, for example, be determined by microscopy, in particular by a scanning electron microscope (SEM).

In the present invention, said metal nanowire(s) can comprise at least one metal chosen in particular from silver, gold, copper, nickel and one of their mixtures.

In a specific embodiment, said metal nanowire(s) can comprise at least 10% by weight of metal, preferably at least 30% by weight of metal and particularly preferably at least 80% by weight of metal, with respect to the total weight of said nanowire(s).

The metal layer of the invention can comprise at least 5% by weight of metal nanowires, preferably at least 10% by weight of metal nanowires, preferably at least 30% by weight of metal nanowires and preferably at least 50% by weight of metal nanowires, with respect to the total weight of the metal layer.

The metal nanowires used in the invention can be commercially available metal nanowires, such as, for example, those sold by ACS Material under the reference AgNw60IPA, or else they can be manufactured according to one of the techniques described in the following papers, incorporated by reference in the present invention: Nanotechnology, 24 (2013), 215501 (6 pp); Nano Research, 2014, 7(3), 315-324.

The metal layer of the invention can be obtained according to different manufacturing processes.

According to a first alternative form, the metal layer can be obtained from a composition, in particular a liquid composition, comprising metal nanowires and a hydroxylated solvent. The hydroxylated solvent is intended to be evaporated in order to form the metal layer.

Preferably, the composition of the first alternative form does not comprise a polymer and/or a polymer precursor, in particular the polymers and/or polymer precursors described in the second alternative form below. In the present invention, "liquid composition" is understood to mean a composition preferably having a viscosity of at most 10.0 pascal-second (Pa·s) (at 25° C.).

Preferably, the amount of metal nanowires in the hydroxylated solvent can range from 0.05 to 10 grams per litre of composition.

In the present invention, the hydroxylated solvent preferably has a boiling point of at most 200° C. It can be chosen from water or alcohols, it being possible for the alcohols to be chosen from methanol, ethanol, isopropanol, butanol, cyclopentanol and one of their mixtures. Preferably, the hydroxylated solvent can be a mixture of water and of an alcohol. The ratio by weight of the water to the alcohol can range from 0.5 to 5.0 and preferably from 1.0 to 2.0.

In this first alternative form, the metal layer can comprise at least 80% by weight of metal nanowires, preferably at least 90% by weight of metal nanowires and particularly preferably 100% by weight of metal nanowires, with respect to the total weight of the metal layer.

According to a second alternative form, the metal layer can be obtained from a composition, in particular a liquid composition, comprising:
  metal nanowires, and
  at least one polymer and/or at least one polymer precursor, and
  optionally a hydroxylated solvent, the hydroxylated solvent being as defined in the present invention.

Preferably, the hydroxylated solvent can be a mixture of water and of an alcohol. The ratio by weight of the water to the alcohol can range from 0.5 to 5.0 and preferably from 1.0 to 2.0.

The composition of this second alternative form can comprise from 0.1% by weight to 15.0% by weight of metal nanowires, preferably from 0.5% by weight to 5.0% by weight of metal nanowires and preferably from 1.0% by weight to 3.0% by weight of metal nanowires, with respect to the total weight of the composition.

The composition of this second alternative form can comprise from 0.1% by weight to 25.0% by weight of polymer(s) and/or of polymer precursor(s), preferably from 0.5% by weight to 10.0% by weight of polymer(s) and/or of polymer precursor(s) and preferably from 1.0% by weight to 5.0% by weight of polymer(s) and/or of polymer precursor(s), with respect to the total weight of the composition.

Said composition of this second alternative form can comprise at least 60% by weight of hydroxylated solvent, preferably at least 80% by weight of hydroxylated solvent and preferably at least 90% by weight of hydroxylated solvent, with respect to the total weight of the composition.

In this second alternative form, the metal layer is a layer additionally comprising at least one polymer.

In the present invention, "polymer" is understood to mean any type of polymer well known to a person skilled in the art, such as homopolymer or copolymer (e.g. block copolymer, random copolymer, terpolymer, and the like).

In this second alternative form, the polymer can be of the organic type, such as, for example, a polymer chosen from olefin polymers, epoxy polymers, urethane polymers, amide polymers, ketone polymers, phthalate polymers, fluoropolymers, polymers of the latex type (or, in other words, dispersions of particles of hydrophobic polymer in water), saccharide polymers (or, in other words, polysaccharides), vinyl polymers, styrene polymers, sulfone polymers and one of their mixtures. Mention may be made, as olefin polymers, of: ethylene polymers or propylene polymers; as fluoropolymers, of: fluoroethylene polymers (FEPs), polyvinylidene fluoride (PVDF), the copolymer of polyvinylidene fluoride and of polytrifluoroethylene (PVDF-PTrFE), or Nafion (CAS: 66796-30-3); as saccharide polymers, of: chitosan, alginates, cellulose and its derivatives, such as, for example, carboxymethyl cellulose (CMC); as vinyl polymers, of: polyvinylpyrrolidone (PVP); as styrene polymers, of: polymer and its derivatives or the mixture of poly(3,4-ethylenedioxythiophene) and of sodium poly(styrene sulfonate) (PEDOT:PSS).

The organic polymer precursor or precursors can, for example, be precursors chosen from precursors of the above-mentioned polymers. Mention may be made, by way of example of precursors, of bisphenol A derivatives, such as bisphenol A diglycidyl ether.

The polymer can also be of the inorganic type, such as, for example, a polymer chosen from polyorganosiloxanes.

The inorganic polymer precursor or precursors can, for example, be precursors chosen from precursors of polyorganosiloxanes. Mention may be made, by way of example, of polydimethylsiloxane (PDMS).

The polymer of this second alternative form may or may not be functionalized.

In this second alternative form, the metal layer can comprise at least 5% by weight of metal nanowires, preferably at least 10% by weight of metal nanowires and preferably at least 30% by weight of metal nanowires.

In a specific embodiment of this second alternative form, the metal layer can comprise at least 80% by weight of metal nanowires, preferably at least 90% by weight of metal nanowires and particularly preferably at least 95% by weight of metal nanowires, with respect to the total weight of the metal layer.

The metal layer of the invention can additionally comprise conducting fillers, other than the metal nanowires of the invention.

These conducting fillers can be electrically conducting and/or thermally conducting fillers.

By way of example, the electrically conducting fillers can be chosen from carbon nanotubes or their derivatives, graphene or its derivatives, or conducting polymers, such as, for example, polymers derived from poly(3,4-ethylenedioxythiophene) or polyaniline.

The thermally conducting fillers can be fillers based on boron nitride and/or on metal oxides.

In the present invention, the retention of the metal layer can be optimized by a polymeric layer which surrounds the metal layer and/or by the presence of at least one polymer in the metal layer.

"Polymeric layer" is understood to mean a layer comprising at least one polymer and preferably at least one organic polymer. Preferably, this polymeric layer can comprise more than 50% by weight of a polymer, with respect to the total weight of the polymeric layer.

Therefore, when the first alternative form described above is employed for the formation of the metal layer of the invention, the electric cable can preferably comprise a polymeric layer surrounding the metal layer, this polymeric layer being directly in physical contact with the metal layer.

When the second alternative form described above is employed for the formation of the metal layer, the electric cable may or may not comprise a polymeric layer surrounding the metal layer, this polymeric layer being directly in physical contact with the metal layer.

In the present invention, the thickness of the metal layer can range from 20 nm (nanometre) to 1.0 mm (millimetre) and preferably from 50 nm to 600 nm.

In a specific embodiment, the metal layer can be directly in physical contact with the electrically insulating layer.

The Electrically Insulating Layer

The electrically insulating layer of the invention surrounds the elongated electrical conductor.

It can be easily shaped by extrusion around the elongated conducting element. The term used is then "extruded layer".

In the present invention, "electrically insulating layer" is understood to mean a layer, the electrical conductivity of which can be at most $1.10^{-8}$ S/m (siemens per metre) (at 25° C.), preferably at most $1.10^{-9}$ S/m, and preferably at most $1.10^{-13}$ S/m (at 25° C.).

In a preferred embodiment, the electrically insulating layer can be directly in physical contact with the elongated electrical conductor.

The electrically insulating layer can be a "thermoplastic" layer or, in other words, a non-crosslinked layer.

"Non-crosslinked" is understood to mean a layer, the gel content of which, according to Standard ASTM D2765-01 (extraction with xylene), is at most 20%, preferably at most 10%, preferably at most 5% and particularly preferably 0%.

The electrically insulating layer is preferably a polymeric layer comprising at least one polymer.

Said polymer can preferably be an olefin polymer and preferably an ethylene polymer. An olefin polymer is conventionally a polymer obtained from at least one olefin monomer.

By way of example, the polymer can be chosen from a linear low-density polyethylene (LLDPE); a very low-density polyethylene (VLDPE); a low-density polyethylene (LDPE); a medium-density polyethylene (MDPE); a high-density polyethylene (HDPE); an ethylene/propylene elastomer copolymer (EPM); an ethylene/propylene/diene monomer terpolymer (EPDM); a copolymer of ethylene and of vinyl ester, such as a copolymer of ethylene and of vinyl acetate (EVA); a copolymer of ethylene and of acrylate, such as a copolymer of ethylene and of butyl acrylate (EBA) or a copolymer of ethylene and of methyl acrylate (EMA); a copolymer of ethylene and of α-olefin, such as a copolymer of ethylene and of octene (PEO) or a copolymer of ethylene and of butene (PEB); a fluoroethylene polymer (FEP); a perfluoroalkoxy polymer (PFA), a polytetrafluoroethylene (PTFE) and one of their mixtures.

In a particularly preferred embodiment, the electrically insulating layer can be a hydrophilic layer.

In the present invention, "hydrophilic" is understood to mean a layer, the surface of which exhibits a contact angle (or drop angle) of strictly less than 80° and preferably of greater than or equal to 10°.

The measurement of the contact angle gives an account of the ability of a liquid to spread over a surface via wettability. The method consists in measuring the angle of the tangent of the profile of a drop deposited on the layer, with the surface of the layer.

The contact angle is typically measured using a goniometer, at 25° C., using distilled water.

The electrically insulating layer of the invention can be treated before the deposition of the metal layer around the electrically insulating layer, in order to improve the hydrophilic properties of its external surface. Said external surface of the electrically insulating layer is that furthest from the elongated electrical conductor.

The improvement in the hydrophilic properties of the external surface of the electrically insulating layer advantageously makes it possible, when the metal layer of the invention is directly in physical contact with the electrically insulating layer, to optimize the retention of the metal layer at the surface of the electrically insulating layer.

Said surface treatment can be carried out by any type of process well known to a person skilled in the art. As such, mention may be made of treatments for the surface oxidation of the electrically insulating layer or treatments for functionalizing the surface of the electrically insulating layer.

The thickness of the electrically insulating layer can range from 0.1 mm to 80 mm.

The Electrical Conductor

The elongated electrical conductor of the invention can be a monoconductor, such as, for example, a metal wire, or a multiconductor, such as a plurality of metal wires, which may or may not be twisted.

The elongated electrical conductor can be produced from a metal material chosen in particular from aluminium, an aluminium alloy, copper, a copper alloy and one of their combinations.

The nominal cross section of the electrical conductor can range from 0.5 mm² to more than 1200 mm² and preferably from 50 mm² to 240 mm². The nominal cross section of the electrical conductor can in particular be defined according to Standard IEC 60228 (2004).

The Electric Cable

The electric cable of the invention is preferably an electric cable for the transmission of digital or analogue signals at high or low frequency, comprising two elongated electrical conductors (i.e., the elongated electrical conductor and the metal layer) separated by the electrically insulating layer. These two electrical conductors are positioned coaxially along the electric cable or, in other words, the axes of central symmetry of the two electrical conductors are coincident.

In the present invention, the electric cable of the invention can preferably be a cable of coaxial type.

In a specific embodiment, the electric cable of the invention can comprise at least two of said elongated electrical conductors. Each elongated electrical conductor can be surrounded by at least said electrically insulating layer, thus forming at least two insulated electrical conductors.

The combination of said insulated electrical conductors can be surrounded by said metal layer.

Preferably, the insulated electrical conductors are twisted together and can thus form a twisted pair of insulated electrical conductors "screened" by virtue of said metal layer.

In this specific embodiment, said electric cable can be of the LAN—FTP (Local Area Network—Foiled Twisted Pair) type.

In the present invention, the electric cable can comprise one or more metal layer(s) in accordance with the invention.

The electric cable can additionally comprise an exterior protective sheath surrounding the metal layer, the exterior protective sheath preferably being an electrically insulating layer.

This exterior protective sheath can be directly in physical contact with said metal layer and, for this reason, it can thus act as retaining layer for said metal layer.

The exterior protective sheath can be conventionally based on one or more polymer(s) chosen from olefin polymers, chlorinated polymers or fluoropolymers, with optionally at least one flame-retardant filler, such as aluminium trihydroxide (ATH), magnesium dihydroxide (MDH) or chalk. Preferably, the protective sheath is an "HFFR" (Halogen-Free Flame Retardant) sheath according to Standard IEC 60754, Parts 1 and 2 (2011).

The cable of the invention can have an exterior diameter of at most 1.0 mm and preferably of at most 0.3 mm, in particular for coaxial cables. It can also have an exterior diameter of greater than 1.0 mm which can range up to 20 mm, in particular for cables of LAN—FTP type.

Manufacturing Process

Another subject-matter in accordance with the invention is a process for the manufacture of an electric cable according to the invention, characterized in that it comprises the following stage:

iii. forming the metal layer around the electrically insulating layer, in particular from a liquid composition.

Stage iii is the stage of formation of the metal layer around the electrically insulating layer.

The metal layer can be formed by different processes.

According to a first alternative form of stage iii, the metal layer can be obtained from a composition, in particular from a liquid composition, comprising metal nanowires and a hydroxylated solvent. The hydroxylated solvent is intended to be evaporated in order to form the metal layer.

The metal layer is thus formed by depositing this composition around the electrically conducting layer, for example by spray coating or dipping.

Spray coating consists in nebulizing said composition in the direction of the electrically insulating layer, the hydroxylated solvent then evaporating at the time of the deposition to leave the dry substance to cover the electrically insulating layer.

Dipping consists in statically or continuously immersing the electrically insulating layer in a bath of said composition.

During the withdrawal of the hydroxylated solvent, for example by evaporation, optionally under a controlled atmosphere, the metal layer is formed and remains attached around the electrically insulating layer.

In order to facilitate the evaporation of the hydroxylated solvent, whether in the spray coating or dipping method, the electrically insulating layer can be heated before the nebulization and after the deposition, in order to optimize the evaporation of the residual hydroxylated solvent present in the metal layer thus deposited.

According to a second alternative form of stage iii, the metal layer can be obtained from a composition, in particular from a liquid composition, comprising:

metal nanowires, and at least one polymer and/or at least one polymer precursor, and optionally a hydroxylated solvent.

In this second alternative form, the metal layer formed is thus a layer additionally comprising at least one polymer.

The metal layer is thus formed by depositing this composition around the electrically conducting layer, for example by dipping or by extrusion according to the type of polymer(s) and/or of polymer precursor(s) used.

Dipping consists in statically or continuously immersing the electrically insulating layer in a bath of said composition.

When at least one polymer is used, the composition can additionally comprise a solvent intended to dissolve the polymer in the composition. Said solvent can be any type of solvent well known to a person skilled in the art, such as, for example, chosen from solvents of hydroxylated, ketone, ether, amine and carboxylic acid ester type.

Thus, the stage of deposition of the metal layer around the electrically insulating layer can be followed by a heat treatment stage which consists in particular in evaporating the solvent in order to form the metal layer.

When at least one polymer precursor is used, the stage of deposition of the metal layer around the electrically insulating layer can be followed by a heat treatment stage which consists in particular in heating the metal layer to a temperature sufficient to polymerize and/or cure and/or crosslink the metal layer.

The process for the manufacture of the electric cable according to the invention can additionally comprise the following stage ii, prior to stage iii:

ii. treating the exterior surface of the electrically insulating layer.

For this reason, stage iii consists in forming the metal layer around the electrically insulating layer treated in stage ii.

Stage ii advantageously makes it possible to optimize the hydrophilic properties at the external surface of the electrically insulating layer formed in stage i.

The hydrophilic properties of the electrically insulating layer can be improved by different treatments of its surface, such as, for example:

by oxidizing the surface of the electrically insulating layer, or by functionalizing the surface of the electrically insulating layer.

The surface oxidation can be of the chemical or physical type. The physical oxidation can consist of a surface oxidation by plasma or corona. The plasma can, for example, be an argon plasma or a plasma of an $O_2/SF_6$ mixture, these plasmas being well known to a person skilled in the art. The chemical oxidation can consist in using an ozonizer or an oxidizing medium, such as, for example, a medium based on entities of pure nitric acid type, diluted or as a mixture, on sodium hypochlorite or others.

The surface functionalization can consist in grafting or in adsorbing, by techniques well known to a person skilled in the art, chemical entities at the surface of the electrically insulating layer.

In a preferred embodiment, stage ii consists in oxidizing the exterior surface of the electrically insulating layer.

The process for the manufacture of the electric cable according to the invention can additionally comprise the following stage i, prior to stage ii or iii:

i. forming the electrically insulating layer around the elongated electrical conductor.

Stage i can be carried out by extruding, by techniques well known to a person skilled in the art, the electrically insulating layer around the elongated electrical conductor.

BRIEF DESCRIPTION OF THE DRAWINGS

Other characteristics and advantages of the present invention will become apparent in the light of the description of non-limiting examples of an electric cable according to the invention, given with reference to the single figure.

FIG. 1 represents a diagrammatic view in lateral section of an electric cable in accordance with the invention.

DETAILED DESCRIPTION

For reasons of clarity, only the elements essential to the understanding of the invention have been presented, diagrammatically, without observing a scale.

The electric cable, illustrated in FIG. 1, is a "coaxial" cable, comprising a central elongated electrically conducting element 1, in particular made of copper or of aluminium, comprising a plurality of metal wires, the electrically conducting element having a nominal cross section of 0.0020 mm$^2$ (diameter of 0.05 mm).

The electric cable additionally comprises several layers positioned successively and coaxially around this conducting element 1, namely:
- an electrically insulating layer 2 of a fluoroethylene polymer (FEP) sold by Chemours under the reference FEP 106,
- a metal layer 3 comprising metal nanowires according to the invention,
- a protective sheath 4 of a fluoroethylene polymer (FEP) sold by Chemours under the reference FEP 106.

The layers 2 and 4 are conventional polymeric layers, extruded by techniques well known to a person skilled in the art.

The metal layer 3 of the electric cable of FIG. 1 can be produced according to the examples which will follow.

Exemplary Embodiments of an Electric Cable According to the Invention

1. Starting from a Composition Comprising Metal Nanowires and a Solvent

An electric cable comprising a central elongated electrical conductor made of copper surrounded by an electrically insulating layer of a fluoroethylene polymer (FEP) sold by Chemours under the reference FEP 106 is treated by oxygen plasma under the following conditions: 100 millilitres of oxygen per minute; 120 watts; for 90 seconds.

The electric cable thus treated is then passed under a system for spray coating with a liquid composition comprising a solvent of the isopropanol type and silver nanowires at 0.5 gram per litre in the liquid composition, said silver nanowires having an aspect ratio equal to 125 (cylindrically shaped nanowires having the following dimensions: length of 10 μm and diameter of 80 nm) and being manufactured according to the process described in the paper Nanotechnology, 24 (2013), 215501 (6 pp). The liquid composition is nebulized under air.

Prior to the nebulization of the liquid composition, the electric cable is preheated to 90° C., the solvent thus evaporating during the deposition.

The metal layer is thus formed around the electrically insulating layer and has a thickness of 200 nm.

The metal layer comprises 100% by weight of metal nanowires, with respect to the total weight of the metal layer.

It makes possible efficient shielding with a sheet resistance of less than 10 ohms/square.

2. Starting from a Composition Comprising Metal Nanowires and an Organic Polymer Precursor An electric cable comprising a central elongated electrical conductor made of copper surrounded by an electrically insulating layer of a fluoroethylene polymer (FEP) sold by Chemours under the reference FEP 106 is treated by passing into a liquid medium based on nitric acid (mixture of 40% by weight of nitric acid and of 60% by weight of sulfuric acid) for 30 seconds and is then dried with hot air.

The electric cable thus treated is then dipped in a liquid composition comprising:
- epoxy resin precursors, such as, for example, the compounds referenced Araldite CY 179CH (epoxy resin) and Aradur 917 (hardener of the epoxy resin), which are sold by Huntsman; and
- copper nanowires at 1 gram per litre in the liquid composition, said copper nanowires having an aspect ratio equal to 500 (cylindrically shaped nanowires having the following dimensions: length of 50 μm and diameter of 100 nm) and being manufactured according to the process described in the paper Nano Research, 2014, 7(3), 315-324.

At the dipping outlet, the electric cable thus dipped is heated at a temperature of 150° C. for 2 minutes in order to obtain the cured resin containing the copper nanowires around the electrically insulating layer.

The metal layer is thus formed around the electrically insulating layer and has a thickness of 300 nm.

The metal layer comprises 50% by weight of metal nanowires, with respect to the total weight of the metal layer.

It makes possible efficient shielding with a sheet resistance of less than 10 ohms/square.

3. Starting from a Composition Comprising Metal Nanowires and at Least One Organic Polymer An electric cable comprising a central elongated electrical conductor made of copper surrounded by an electrically insulating layer of a fluoroethylene polymer (FEP) sold by Chemours under the reference FEP 106 is treated by physical oxidation of the argon plasma type for 120 to 180 seconds, with a power of 300 watts.

The electric cable thus treated is then dipped in a liquid composition comprising:
- 1.8% by weight of silver nanowires having an aspect ratio equal to 125 (cylindrically shaped nanowires having the following dimensions: length of 10 μm and diameter of 80 nm), said silver nanowires being manufactured according to the process described in the paper Nanotechnology, 24 (2013), 215501 (6 pp),
- 1.2% by weight of a polysaccharide polymer of the carboxymethyl cellulose (CMC) type, sold by Sigma-Aldrich under the reference sodium carboxymethyl cellulose,
- 40% by weight of methanol as solvent, and
- 57% by weight of water as solvent.

The amounts expressed in the above liquid composition are expressed as percentages by weight, with respect to the total weight of the liquid composition.

At the dipping outlet, the electric cable thus dipped is dried until the solvent has evaporated. The cable can subsequently be heated at a temperature of 230° C. for 2 minutes in order to improve its mechanical strength and the electrical resistance.

The metal layer is thus formed around the electrically insulating layer and has a thickness of 800 nm.

The metal layer comprises 60% by weight of metal nanowires, with respect to the total weight of the metal layer.

It makes possible efficient shielding with a sheet resistance of less than 10 ohms/square and an attenuation of at least 20 decibels (dB) according to Standard IEC 62153-4-10 (2015).

The invention claimed is:

1. An electric cable comprising:
   at least one elongated electrical conductor,
   at least one electrically insulating layer surrounding said elongated electrical conductor,
   at least one metal layer surrounding said electrically insulating layer,
      wherein the metal layer is obtained from a composition comprising metal nanowires and a hydroxylated solvent, and wherein the aspect ratio of the metal nanowires making up the metal layer is of at least 50.

2. The electric cable according to claim 1, wherein at least one of the metal nanowires has one of its dimensions of at most 400 nm.

3. The electric cable according to claim 1, wherein at least one of the metal nanowires comprises at least one metal chosen from silver, gold, copper, nickel and one of their mixtures.

4. The electric cable according to claim 1, wherein at least one of the metal nanowires comprises at least 10% by weight of metal, with respect to the total weight of said nanowire.

5. The electric cable according to claim 1, wherein the metal layer comprises at least 5% by weight of metal nanowires and preferably at least 10% by weight of metal nanowires, with respect to the total weight of the metal layer.

6. The electric cable according to claim 1, wherein the metal layer is obtained from a composition comprising metal nanowires, and at least one polymer and/or at least one polymer precursor.

7. The electric cable according to claim 1, wherein the metal layer is directly in physical contact with the electrically insulating layer.

8. The electric cable according to claim 1, wherein the thickness of the metal layer ranges from 20 nm to 1.0 mm.

9. The electric cable according to claim 1, wherein the electrically insulating layer is a polymeric layer comprising at least one olefin polymer, preferably at least one ethylene polymer and particularly preferably at least one fluoroethylene polymer (FEP).

10. The electric cable according to claim 1, wherein the electrically insulating layer is a hydrophilic layer.

11. The electric cable according to claim 1, wherein said cable is additionally comprises an exterior protective sheath surrounding the metal layer.

12. A process for the manufacture of a cable according to claim 1, wherein said process comprises the following stage:
   iii. forming the metal layer around the electrically insulating layer.

13. The process according to claim 12, wherein said manufacturing process additionally comprises the following stage ii, prior to stage iii:
   ii. treating the exterior surface of the electrically insulating layer.

14. The process according to claim 13, wherein stage ii consists in oxidizing the exterior surface of the electrically insulating layer.

15. The electric cable according to claim 1, wherein the aspect ratio of the metal nanowires making up the metal layer is of at least 100.

* * * * *